March 4, 1969

T. W. KWAP ETAL     3,431,490

APPARATUS FOR INDICATING RESPONSE OF A TEST
CIRCUIT TO AN APPLIED PULSE

Filed Jan. 14, 1966

INVENTORS
THEODORE W. KWAP
CARL E. RUOFF

BY *Bernard N. Wiener*

ATTORNEY

March 4, 1969 T. W. KWAP ET AL 3,431,490
APPARATUS FOR INDICATING RESPONSE OF A TEST
CIRCUIT TO AN APPLIED PULSE
Filed Jan. 14, 1966

United States Patent Office 3,431,490
Patented Mar. 4, 1969

3,431,490
APPARATUS FOR INDICATING RESPONSE OF A TEST CIRCUIT TO AN APPLIED PULSE
Theodore W. Kwap, Brewster, and Carl E. Ruoff, Apalachin, N.Y., assignors to International Business Machines Corporation, Armonk, N.Y., a corporation of New York
Filed Jan. 14, 1966, Ser. No. 520,617
U.S. Cl. 324—57          19 Claims
Int. Cl. G01r 27/00, 11/00

ABSTRACT OF THE DISCLOSURE

A circuit for providing an output voltage proportional to the area of input pulses. The circuit will provide an indication of the time delays of a test circuit, when input pulses are applied thereto. A pulse train is applied to one input of a two-input integrator, whose output voltage is an indication of the area of the input pulses. This output is fed back as one input to a single shot multi-vibrator another input being clock pulses which are related to said input pulses. The feedback signal controls the output from the single shot multi-vibrator, which output is the second input to said integrator. The multi-vibrator could be replaced by a differential amplifier, the clock pulses being replaced by voltage ramps.

This invention relates generally to pulse area measuring apparatus and it relates more particularly to an apparatus of this type for indicating the delay response of a test circuit to a prescribed pulse.

The prior art provides solutions for measurement of pulse width and delay response time of a test circuit through several techniques. One technique uses a sampling oscilloscope to obtain a direct visual indication of pulse width. Another technique provides for conversion of pulse width to an oscillatory burst at a particular frequency and uses a counter to indicate numerically a measurement of pulse width. Both of these techniques require complex electronic circuitry and do not provide a voltage level indicative of pulse width. In another technique of the prior art, pulse width is converted to a direct voltage level. However, prior art circuitry for this technique has been complex, relatively slow, and relatively insensitive to narrow pulse width.

It is an object of this invention to provide apparatus for measuring pulse area.

It is another object of this invention to provide apparatus for measuring the area of a voltage pulse in a train thereof.

It is another object of this invention to provide apparatus for providing a voltage level indicative of the integral of pulse height and pulse width.

It is another object of this invention to provide apparatus for providing a voltage level indicative of pulse height if the pulse width is maintained constant.

It is another object of this invention to provide apparatus for providing a voltage level indicative of pulse width if pulse height is maintained constant.

It is another object of this invention to provide apparatus for measuring delay time of an electrical circuit.

It is another object of this invention to provide apparatus for measuring on or off delay times of a test circuit.

This invention provides apparatus for measuring the area of a pulse in a pulse train thereof. The pulses are applied to one input of a two input integrator circuit whose output voltage level is an indication of the pulse area after the circuitry has arrived at equilibrium. The output voltage level from the integrator is used to control the output wave form from a circuit which in the equilibruim state has equal and opposite area to that of the input pulse. The input of the latter circuit is adapted to receive a clock pulse train synchronously derived from or related to the input pulse train; and the output of the latter circuit is adapted to be applied to another input of the integrator.

Under the operational circumstance that the pulse amplitude of the input pulses is maintained constant, the output direct voltage level of the apparatus according to this invention provides a measurement of the pulse width; and under the operational circumstance that the pulse width is maintained constant, the voltage output of the apparatus is a measure of the pulse amplitude.

In the practice of one feature of this invention, a single shot or monostable multivibrator is used to provide the output wave form applied to the integrator circuit for balancing the input from the input pulse train. In the practice of another feature of this invention, a difference amplifier is used for this function. For its operation a ramp voltage is used. The invention is readily practiced to provide a measure of delay response of a test circuit as reflected in the rise time and fall time of the output wave form therefrom.

It is an advantage of this invention that the technique provided therefor obtains a measurement of time delays in test circuitry easily applicable for measuring pulse widths or delays in rise and fall times of the order of nanoseconds.

It is another advantage of this invention that the circuitry provided therefor has relatively few components compared to circuitry of the prior art for providing an analagous function.

The foregoing and other objects, features and advantages of the invention will be apparent from the following more particular description of preferred embodiments of the invention as illustrated in the accompanying drawings.

In the drawings:
FIGURE 1 is a schematic circuit diagram of an embodiment of this invention illustrating the cooperation of a single shot and an integrator to provide a measure of a voltage pulse area.

FIGURE 2 provides pulses in timing relationship useful for explaining the operation of the embodiment of FIGURE 1 in which FIGURE 2A is indicative of the progressive growth in the area of the output pulse from the single shot. FIGURE 2B is indicative of the mirror image relationship between the input voltage pulse whose area is to be measured and the stabilized area of the pulse from the single shot.

Figure 1:
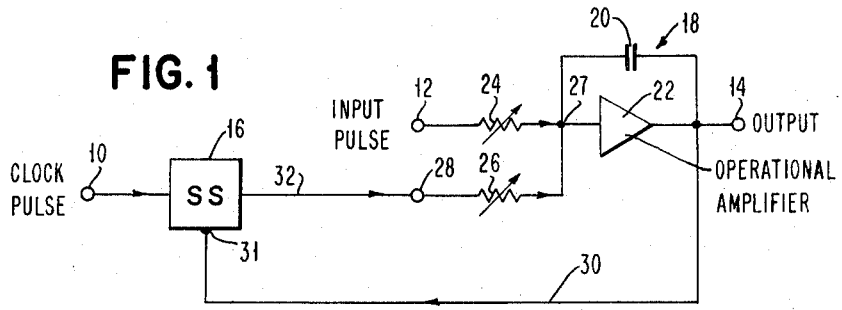

With reference to FIGURE 1 a preferred embodiment of the invention is shown in which a single shot 16 is cooperatively interconnected with an integrator 18 to provide an output voltage on terminal 14 as an indication of the area of a repetitious input pulse applied to input terminal 12 when a suitable clock pulse train is applied to terminal 10 of the single shot. The remaining specifics of FIGURE 1 include a resistor 24 connecting input terminal 12 to input terminal 27 of operational amplifier 22 and of capacitor 20 which together comprise integrator 18; and connection 32 from the output of single shot 16 to input terminal 28 of integrator 18 which is connected by resistor 26 to terminal 27 of operational amplifier 22. The circuitry of FIGURE 1 is completed by feedback connection 30 from output terminal 14 of integrator 18 to control terminal 31 of single shot 16.

Although resistors 24 and 26 may have different values, for the illustrative operations of the embodiment of FIGURE 1 to be described with reference to the timing diagrams of FIGURES 2 and 4, resistors 24 and 26 are considered to be identical in value. Effectively, voltages applied contemporaneously to input terminal 12 and 28 of integrator 18 are summed at terminal 27 therein to which voltage level the integrator is then responsive. The feedback voltage from output terminal 14 applied to terminal 31 of single shot 16 controls the time duration of the output pulse therefrom which is initiated by a clock pulse applied to terminal 10. Structural details of single shot 16 will be described in detail hereinafter with reference to FIGURE 5. Capacitor 20 begins charging toward a voltage level proportional to the voltages applied to terminal 12 and 28 of integrator 18. A positive voltage aplied to input terminal 12 is amplified by amplifier 22 whose output falls toward a lower voltage due to inversion in amplifier 22. However, it will be hindered by capacitor 20 which initially appears as a short circuit and starts to charge negatively. However, a positive voltage remains at terminal 27 and capacitor 20 begins charging up, which can occur only by the operational amplifier 22 supplying the necessary charge. Were amplifier 22 capable of going to an infinite voltage with the input voltage at terminal 12 remaining for an infinite time, terminal 14 would ramp negatively toward minus infinity. However, for suitable operation of the embodiment of FIGURE 1, operational amplifier 22 need only be capable of driving the voltage controlled single shot 16 to the extreme pulse width required for operation of the embodiment. The integrator 18 need not be linear for what is required is that the output voltage level on terminal 14 be derived from a time voltage integral appearing on terminal 28 that is ultimately equal to the time voltage integral applied to terminal 12.

Figure 2A:
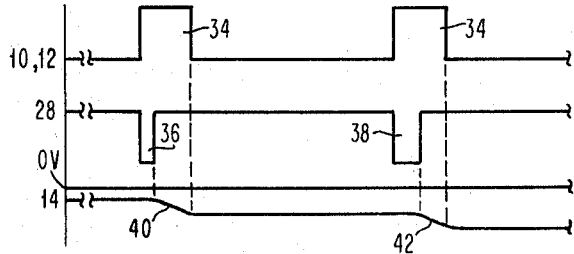
Figure 2B:
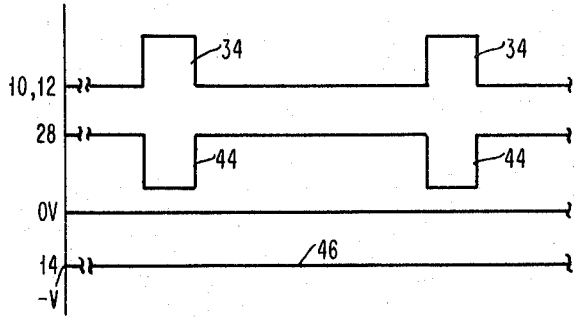

The operation of the embodiment of FIGURE 1 will now be described in detail with reference to the timing diagrams of FIGURES 2 and 4. In the exemplary operation characterized by the timing diagrams of FIGURES 2A and 2B, a pulse train having a repetitive pulses 34 is applied both to input terminal 12 and clock pulse terminal 10. For the first pulse 34, a corresponding pulse 36 is presented by single shot 16 to terminal 28 of integrator 18. Pulse 36 is much narrower than correspondnig pulse 34 but has the same amplitude. The next occurring pulse 34 causes single shot 16 to provide a corresponding pulse 38 on terminal 28 which is wider than pulse 36. In this manner the width of the sequential pulses on terminal 28 of integrator 18 continues to increase in width until the repetitious pulses on terminal 28 have the same width as pulses 34. During the time that pulse 36 appears at terminal 28, the output of integrator 22 on terminal 14 is constant because the time integral of the corresponding pulse 34 for the duration of pulse 36 is equal to that of pulse 36. When pulse 36 returns to the zero voltage level, pulse 34 is still positive, which causes the integrator to ramp more negatively as indicated by ramp 40. Thus, the ramp voltages 40 and 42 on terminal 14 are caused by the difference in pulse width of the corresponding pulses on terminals 12 and 28. Ultimately, as shown in FIGURE 2B, the sequential pulses 44 on terminal 28 are the same duration as sequential pulses 34 on terminal 12, and the output voltage level on terminal 14 is stabilized to the level indicative of the area of pulse 34. Since pulse 34 has a constant amplitude, the voltage level 46 at terminal 14 is a measure of the width of pulse 34.

Figure 3:
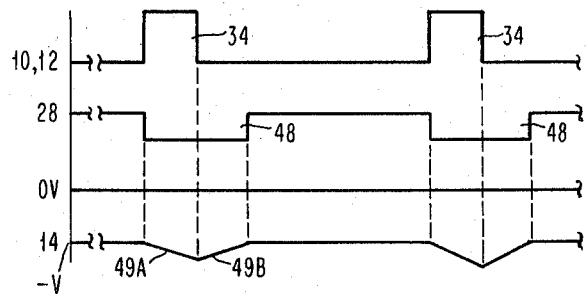
FIGURE 3 is a pulse timing diagram indicating that the amplitude of the pulse from the single shot of FIGURE 1 may be less than the pulse amplitude of the input pulse whose area is to be measured.

The operation of the embodiment of FIGURE 1 will now be described under the operational circumstance that the single shot 16 does not provide an output pulse on terminal 28 having the same amplitude as the corresponding input pulse 34. Illustratively, if the amplitude of the output pulse from the single shot is less than the amplitude of the pulses 34, the time duration of the output pulses from the single shot 16 is longer than the time duration of the input pulses 34 so that the integrals ultimately become equal. This premise is illustrated in FIGURE 3 where the ultimate stabilized situation is shown. Thus, pulses 48 on terminal 28 having an amplitude half that of pulses 34 have a time duration twice as great. The nature of the voltage level on terminal 14 is shown in FIGURE 3. The voltage of terminal 14 has a constant level until the pulse 34 is applied to terminals 10 and 12 of the embodiment of FIGURE 1. Terminal 14 voltage ramps negatively and is shown with ramp 49A because the corresponding pulse 34 is twice the amplitude of pulse 48. Since pulse 34 is positive, the integrator 18 ramps negatively during the time interval of a pulse 34. However, when pulse 34 returns to zero level, pulse 48 which is still present at the input terminal 28 of integrator 18 has a negative voltage, and the integrator 18 ramps positively causing ramp 49B. When pulse 48 has returned to zero level, the integrator remains at a constant voltage output level on terminal 14.

Figure 4:
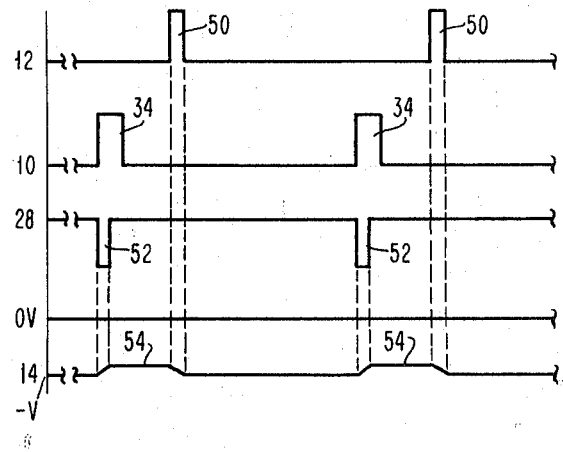
FIGURE 4 is a pulse timing diagram indicating that the pulse output from the single shot of FIGURE 1 may occur at any point during the time interval between sequenital input pulses whose area is to be measured.

FIGURE 4 illustrates the operational circumstance wherein the input pulse on terminal 12 and the clock pulse on terminal 10 are not of the same time duration, and the clock pulse occurs within the pulse repetition rate of the clock pulse train but at any time between each pair of sequential input pulses.

In FIGURE 4 the pulses are shown after the output of intergrator 18 has stabilized at terminal 14. Clock pulses 34 may be derived from input pulses 50 or obtained from a separate source; as shown in FIGURE 4, clock pulses 34 are delayed by a fixed time interval from the corresponding input pulses 50. However, all that is required is that each clock pulse occur between the onset of a preceding input pulse and the onset of the succeeding input pulse. Output pulses 52 on terminal 28 from single shot 16 are derived from clock pulses 34 under the control of the feedback voltage from output terminal 14. The positive input pulses 50 on terminal 12 causes the integrator 18 to ramp negatively during their duration, and the negative pulses on single shot output terminal 28 cause the integrator to ramp positively during their duration. Therefore, the output voltage on terminal 14 is a minus voltage level with positive pulses 54 superimposed thereon. There is a positive ramping of voltage when a pulse 52 is present and a negative ramping of voltage when a pulse 50 is present on terminal 12.

Figure 5:
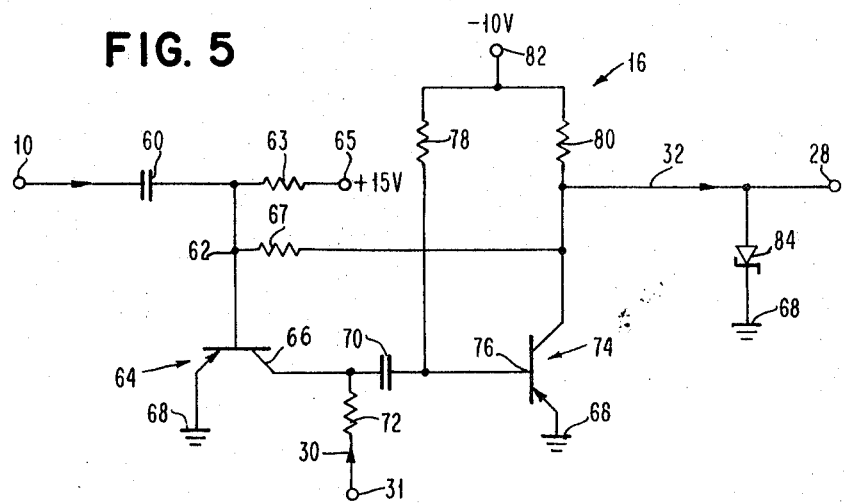
FIGURE 5 is a schematic circuit diagram showing the structure of the single shot of FIGURE 1 at the component level and indicating the connection for varying the width of the output pulse of the single shot.

The detailed nature and operation of a practical circuit for single shot 16 is presented in FIGURE 5. A clock pulse 34 is applied to input terminal 10 for illustrative purpose. Capacitor 60 connected to input terminal 10 differentiates the applied input pulse 34. The negative portion of the differentiated pulse on terminal 62 turns on transistor 64. The emitter terminal of transistor 64 goes to ground 68 voltage level, and the voltage on capacitor 70 is presented to base junction 76 of transistor 74. Previously, capacitor 70 was charged to its present voltage through resistor 72 by the feedback from terminal 14 on line 30 to terminal 31. Illustratively, if the voltage on terminal 14 were −5 volts, capacitor 70 would have charged thereto and the negative voltage appears at terminal 66 and the positive voltage at terminal 76. Therefore, when transistor 64 is turned on by the differentiated pulse from capacitor 60 and the negative terminal capacitor 70 goes to ground and the positive terminal voltage appears at junction 76, capacitor 70 then begins charging to the negative voltage at terminal 82, e.g., −10 volts. When the voltage at base junction 76 of transistor 74 reaches a value that is slightly negative with respect to ground 68, transistor 74 turns on and, as a result, turns off transistor 64 through the resistive network comprising resistors 63 and 67.

The time interval that transistor 74 is turned off is determined by the voltage to which capacitor 70 has charged, which is the voltage at terminal 14. The discharge time of capacitor 70, which represents the time interval of the pulse width being measured, is controlled by the value of the capacitance of capacitor 70, the resistance value of resistor 78, and the value of the negative supply voltage at terminal 82.

Zener diode 84 is used to provide a fixed amplitude for the output pulse from single shot 16 on terminal 28. Zener diode 84 is of a nature that when a voltage applied to terminal 28 attempts to go more negative than the level set by it, e.g., 5 volts, the terminal 28 is held at that level. Alternatively, if terminal 28 is connected via a diode gate to a negative voltage, e.g., −5 volts, the output waveform on terminal 28 also has a fixed amplitude.

In the description of the operation of the embodiment of FIGURE 1 presented above, the resistors 24 and 26 connected to the input terminals 12 and 28, respectively, of integrator circuit 18 were considered to be equal in value and operational characteristics. Generally, the input pulse whose areal characteristics are to be indicated by the voltage level on output terminal 14 need not have the same time duration. This was pointed out in an exemplary manner with reference to FIGURE 3 wherein the timing diagram indicates a relatively narrow pulse 34 on terminal 12 and a wide pulse on terminal 28 whose amplitude was less than the input pulse. By adjustment of the values of resistors 24 and 26 the output waveform from single shot 16 can be adjusted as is required to operate integrator 18 so that ultimate equilibrium may be obtained. Illustratively, if resistor 26 is increased in value while resistor 24 is maintained at a fixed value, in order to charge up condenser 20 of integrator 18 to the same fixed voltage, it is required that the area of the pulse on terminal 28 be greater. Accordingly, the pulse width required at terminal 28 for the ultimate equilibrium of integrator 18 is increased by increasing the value of resistor 26. In comparison, if the value of resistor 26 is maintained constant and the value of resistor 24 is reduced, the charging time of capacitor 20 is decreased and it charges to a higher value for the shorter period of time that the input pulse appears on terminal 12. This requires that a wider pulse be present on terminal 28 to compensate. Practically, the values of resistor 24 and resistor 26 may not be indiscriminately different. Output impedances and the levels required for driving the integrator 18 limit the amount that the resistors may be adjusted.

Figure 6:
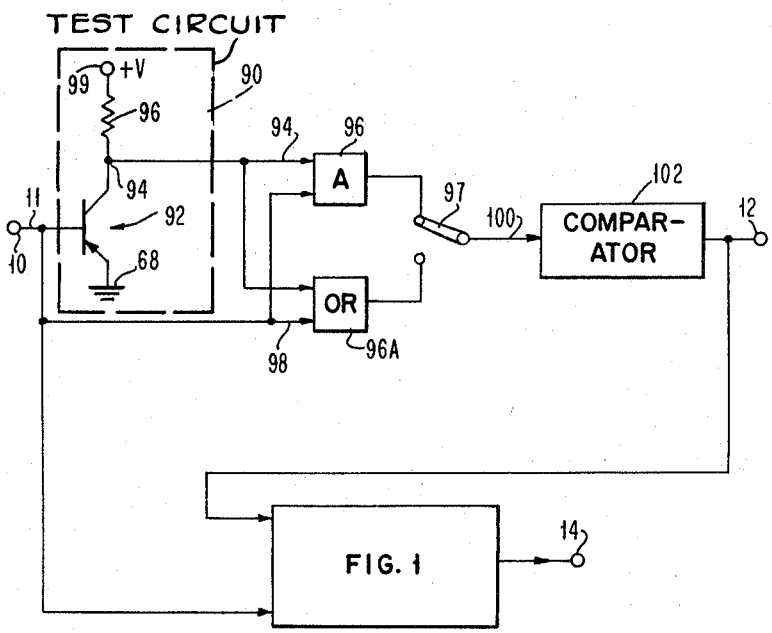
FIGURE 6 is a circuit diagram illustrating the circuitry and circuit connections for obtaining a measure of the delay time of a particular test circuit indicating how the embodiment of FIGURE 1 is cooperatively connected therewith.

FIGURE 6 presents another embodiment of this invention in which the input pulse applied to terminal 12 of the embodiment of FIGURE 1 is derived from an exemplary test circuit 90 comprising a transistor 92. Transistor 92 is a field effect transistor whose drain is connected via resistor 96 to a voltage source 99 and whose source is connected to ground. The practice of the invention as exemplified with reference to FIGURES 2A and 2B is illustrative of the general practice with the embodiment of FIGURE 6. Pulse 34 is supplied via terminal 10 and line 11 to the gate electrode of transistor 92. The applied pulse is delayed and inverted and appears at terminal 94 and is applied therefrom to AND unit 96 and OR unit 96A. Another input to these units is obtained via line 98 from terminal 10. The output pulses from AND unit 96 and OR unit 96A are transmitted via switch 97 and connection 100 to the input of comparator 102, whose output is connected via terminal 12 to the circuit of FIGURE 1. If the switch 97 is connected to AND unit 96, the output pulse at terminal 12 is related to the trailing edge delay in transistor 92; and if switch 97 is connected to OR unit 96A, the output on terminal 12 is related to the leading edge delay in transistor 92. Comparator 102 provides a pulse having a fixed level with essentially a rectangular shape.

Comparator 102 is utilized for selectively identifying either the 10 percent or 90 percent point on the rise and fall time curves, respectively, from the AND unit 96. These 10 percent and 90 percent points on the fall time and rise time curves are conventional points for characterizing the nature of the waveform under consideration. The comparator is readily adjusted for a given voltage to provide an output waveform corresponding to the delay prescribed for the circuit 90 under test.

Figure 7:
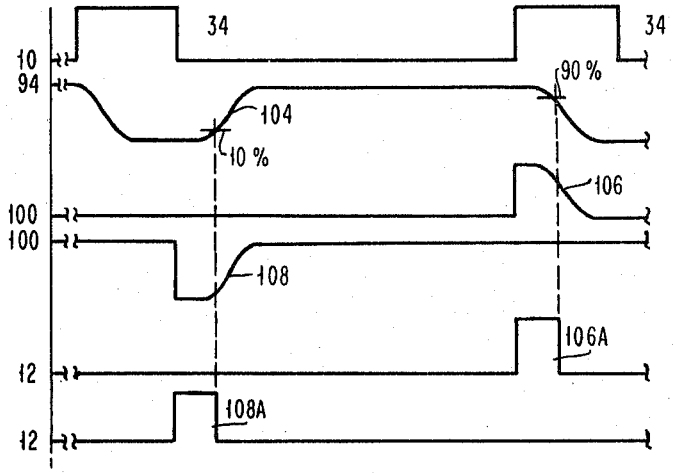
FIGURE 7 is a pulse timing diagram used for explaining the operation of the embodiment of FIGURE 6.
Figure 8:
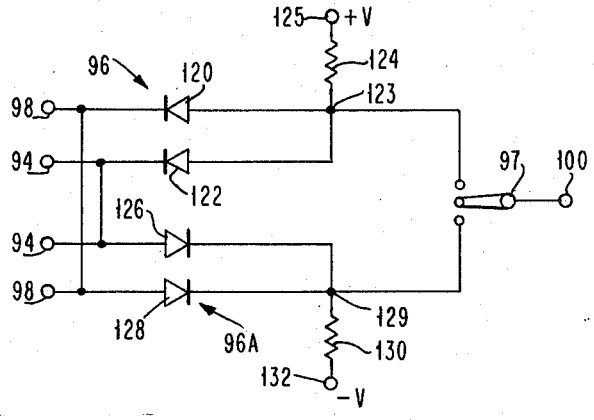
FIGURE 8 is a schematic component circuit diagram indicating the connections for the AND and OR units of FIGURE 6.

The operation of the embodiment of FIGURE 6 will be presented with reference to the timing pulse diagram of FIGURE 7. An input pulse train of pulses 34 is applied to input terminal 10, and an output pulse train of pulses 104 is presented to terminal 94 from test circuit 90. There are delays resultant from circuit components and capacitive loading resultant in the non-vertical rise and fall of pulses 104. Pulse 104 is applied to an input of both AND unit 96 and OR unit 96A via line 94. With respect to the operation using the AND unit 96, the waveform 104 is combined with an input pulse 34, and the resultant output on line 100 via switch 97 is waveform 106. This waveform is applied to the comparator 102 for squaring and amplitude limiting. If the OR unit 96A is used, the waveform 108 is communicated to line 100 via switch 97. It should be noted that the output from the comparator 102 is waveform 106A for the AND function pulse 106, and the output from the comparator 102 for the OR function waveform 108 is waveform 108A.

The AND unit 96 and OR unit 96A of FIGURE 6 will now be described in greater detail. The anodes of diodes 120 and 122 of AND unit 96 are connected to junction 123 which is connected via resistor 124 to a positive voltage source at terminal 125. AND unit 96 seeks the most negative level of either input. A negative signal on either input line 94 or 98 appears at the output of AND unit 96 at terminal 123. The cathodes of diodes 126 and 128 of OR unit 96A are connected via resistor 130 to a negaitve voltage at terminal 132. OR unit 96A at junction 129 seeks the most positive signal applied via lines 94 and 98, which is then applied via switch 97 to line 100.

Figure 9:
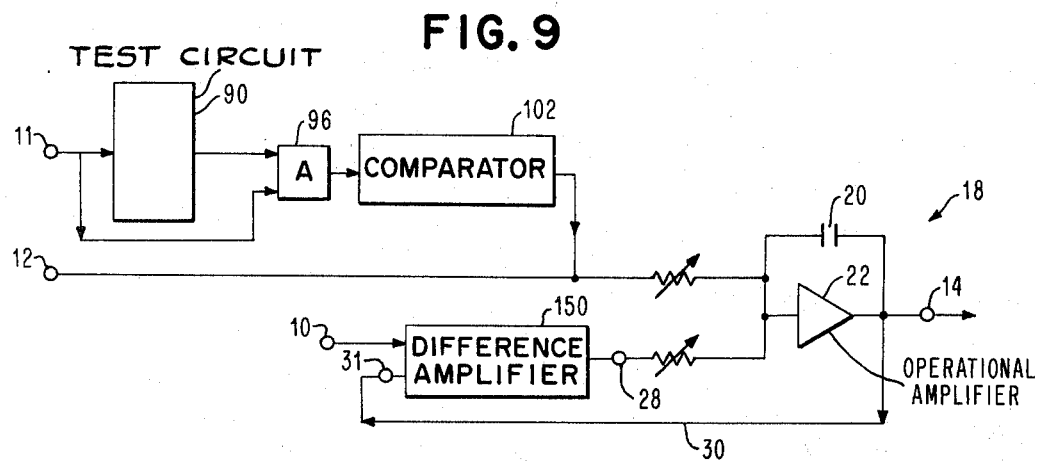
FIGURE 9 is a schematic diagram of another embodiment of this invention indicating the use therein of a difference amplifier.
Figure 10:
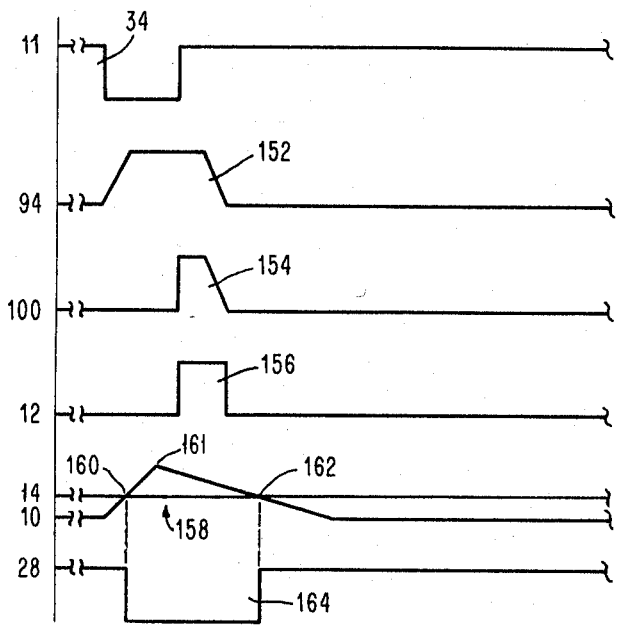
FIGURE 10 is a pulse timing diagram indicating the pulses required for the output obtained from the embodiment of FIGURE 9.

The description of another embodiment of this invention will be presented with reference to FIGURES 9 and 10 of which FIGURE 9 is a schematic circuit diagram and FIGURE 10 is a timing pulse diagram. The structure of FIGURE 9 is comparable to that of FIGURE 1 with the single shot 16 of FIGURE 1 being replaced by difference amplifier 150. In the operation of difference amplifier 150, the difference between inputs on terminal 10 and 31 is amplified by the gain of the amplifier to give a voltage level on terminal 28.

The embodiment in FIGURE 9 differs from the embodiment of FIGURE 1 both in the presence of a difference amplifier 150 instead of the single shot 16 and the application of a voltage ramp to the input terminal 10 of the difference amplifier of the voltage ramp derived at the same time as the application of the input pulse at terminal 10. Difference amplifier 150 has two input terminals, 10 and 31, and an output terminal 28. Its output voltage is equal to the difference between the voltages at its terminals times the gain of the difference amplifier.

For purpose of exposition, the test circuitry of FIGURE 6 is included in cooperative relationship with the changed structure of FIGURE 9. In operation, the input pulse 34 is applied to terminal 11 of test circuit 90, whose output waveform 104 is delayed with a finite rise and wall time. In FIGURE 9 only the AND unit is shown for the exemplary operation. The output of the test circuit 90 is introduced to AND unit 96 together with input pulse 34, and the combined resultant waveform 154 on line 100 is squared by the comparator 102 to provide waveform 156 on terminal 12 of integrator 18. The leading edge 160 of waveform 158, which is ramp in nature, is applied to input terminal 10 of difference amplifier 150. Under the operational circumstance that the integrator 18 starts at zero volts level, difference amplifier 150 switches when ramp 160 reaches point 161 and produces a very wide negative pulse 164 on terminal 28. If pulse 164 is wider than the waveform 156 from comparator 102, the integrator 18 procedes in a positive direction to reduce the negative pulse 164. Where the area of waveform 164 equals that of waveform 156, integrator 18 holds the direct voltage level which has been attained. This voltage on terminal 14 is proportional to the delay in test circuit 90 for any portion of the rise time selected. The operation for the other section of the waveform with its delay and rise time are determined in a comparable manner using the OR function 96A, not shown in FIGURE 9.

Considering that a negative going input pulse 34 is applied to terminal 11 of test circuit 90, the delayed pulse derived therefrom is pulse 152. Considering the use of AND unit 96, the output of AND unit 96 is pulse 154 from comparator 102, from which is obtained pulse 156 on terminal 12 of integrator 18. A ramp voltage 160 is applied to terminal 10 of difference amplifier 150. When ramp voltage 160 of pulse 158 becomes higher than the output voltage on terminal 14, difference amplifier 150 switches from a positive level to a negative voltage level where it remains until the ramp voltage returns below the output voltage of the integrator 18 via descension ramp 162. When the magnitude of the voltage on ramp 160 is equal to the voltage from terminal 14 on terminal 31 of difference amplifier 150, the difference amplifier output at terminal 28 switches in level from zero volts to a negative voltage level. It stays at the negative voltage level until the descending ramp portion 162 of pulse 158 falls below the integrator output leel at terminal 14. FIGURE 10 presents the transient phase wave shapes for the operation of the embodiment of FIGURE 9. The area of pulse 164 decreases in order to become equal to the area of pulse 156. However, the triangular wave shape 158 is a constant factor in the operation of the circuit of FIGURE 9. The only requirement of triangular wave shape 158 is that its peak amplitude 161 be less than the direct voltage level integrator 18 is able to supply to terminal 31.

The description of the invention present herein has been generally in terms of measurement of pulse width. This has been for purposes of exposition, it being clearly understood that the broad implication of the practice of this invention is for measuring area of a pulse in a train thereof.

With reference to FIGURE 1, it will also be understood that integrator 18 may have a plurality of input channels to which may be applied a respective plurality of input pulse trains. Under this operational circumstance, the output on terminal 14 is a measure of an average area of the input pulses. In operation, either one single shot is used with the clock pulses on the terminal thereof being properly timed, or a respective plurality of single shots are used with each being synchronously related to one of the input pulse trains.

What is claimed is:
1. An apparatus for providing a voltage level indicative of the area of an input pulse, there being sequential input pulses, comprising:
   an integrator having first and second input channels, said sequential input pulses being applied to said first channel;
   a source of clock pulses occurring synchronously with respect to adjacent pulses of said sequential input pulses;
   a single shot multi-vibrator which is triggered by said clock pulses;
   a feedback path from said integrator to said single shot multivibrator for controlling the time duration of the output pulses therefrom according to the output voltage level of said integrator,
   the output of said single shot multivibrator being connected so said second input channel of said integrator, the voltage level output of said integrator being indicative of the area of one of said input pulses.

2. Apparatus according to claim 1 wherein said single shot multivibrator provides output pulses therefrom when said clock pulses occur during the time interval between each pair of adjacent input pulses.

3. Apparatus according to claim 1 wherein the amplitude of said input pulses is constant, the output of said integrator being indicative of the pulse width of each of said input pulses.

4. Apparatus according to claim 1 wherein the width of said input pulses is constant, the output of said integrator being indicative of the pulse amplitude of said input pulses.

5. An apparatus for providing a voltage level indicative of the area of an input pulse, there being sequential input pulses, comprising:
   an integrator having first and second input channels, said input pulses being applied to said first channel,
   voltage ramp pulses occurring synchronously with said input pulses;
   a difference amplifier having first and second inputs, said voltage ramp pulses being applied to said first input, said amplifier providing one input to said second channel of said integrator,
   a feedback path from said integrator to the second input of said difference amplifier for controlling the duration of the output from said difference amplifier.

6. An apparatus for providing a voltage level indicative of the area of sequential input pulses, comprising:
   integrator means having a plurality of input channels, the output of said integrator being proportional to said input pulse area, said input pulses being applied to a first input channel,
   circuit means having an input terminal, an output terminal, and a control terminal,
   a feedback path from said integrator to the control terminal of said circuit means to control the time duration of output waveforms from said output terminal, according to the output level of said integrator,
   said output of said circuit means being connected to a second input channel of said integrator means to provide thereto said waveforms.

7. An apparatus for providing an output voltage protional to the area of a plurality of sequential input pulses, comprising:
   means to provide waveforms,
   an integrator having a first and second pluralities
   an integrator having first and second pluralities of input channels, where said input pulses are applied to said first plurality of input channels, and said waveforms are applied to said second plurality of input channels, said waveforms being equal and opposite in area to said area of said respective input pulses when the output from said integrator is in equilibrium,
   said means being controlled by said output of said integrator, which output is fed back to said means to modify the area of said waveforms therefrom.

8. Apparatus according to claim 7 wherein the amplitude of said input pulses is constant.

9. Apparatus according to claim 7 wherein the width of said input pulses is constant.

10. An apparatus for providing a voltage output which is proportional to the delay time of a test circuit, when repetitive input pulses are applied thereto, comprising:
a test circuit to which is applied said input pulses;
means connected to said test circuit for receiving waveforms from said test circuit and said repetitive pulses, said means providing output pulses whose pulse width is indicative of said delay time;
an integrator circuit whose output is representative of said delay time when said apparatus is in equilibrium, said integrator having first and second input channels, the output pulses from said means being applied to said first channels;
a source of clock pulses synchronized with said input repetitive pulses;
a single shot multivibrator having a control terminal, said control terminal being connected in feedback relationship from said integrator output, the output waveforms from said single shot multivibrator being applied to said second input channel of said integrator, said clock pulses being applied to said single shot multivibrator, the output waveforms of said single shot multivibrator being having equal and opposite area to said output pulses from said means when said apparatus is in equilibrium.

11. Apparatus according to claim 10 wherein said means includes an AND circuit, to which is applied said input pulses and said waveforms from said test circuit.

12. Apparatus according to claim 10, wherein said means includes an OR circuit, to which is applied said input pulses and said waveforms from said test circuit.

13. The apparatus of claim 10, wherein said means includes an AND circuit, an OR circuit, and a comparator, said input pulses and said waveforms from said test circuit being applied to said AND circuit and to said OR circuit, said comparator being selectively connectable to either said AND circuit or said OR circuit.

14. The apparatus of claim 13, wherein the output of said comparator is connected to said first channel of said integrator and said input pulses are also applied to said single shot multivibrator.

15. Apparatus for providing a voltage representative of the time of a test circuit when repetitive input pulses are applied thereto, comprising:
a test circuit to which is applied said input pulses,
means connected to said test circuit for receiving waveforms from said test circuit and said repetitive pulses, said means providing output pulses whose pulse width is indicative of said delay time,
an integrator circuit whose output is representative of said delay time when said apparatus is in equilibrium, said integrator having first and second input channels, the output pulses from said means being applied to said first channel,
a source of clock ramp waveforms,
a difference amplifier having first and second inputs, said clock ramp waveforms being applied to said first input, said difference amplifier providing an output which is applied to said second input channel of said integrator,
a feedback path from said integrator to the second input of said difference amplifier to control the area of the output of said difference amplifier.

16. Apparatus according to claim 15, wherein said means includes an AND circuit to which is applied said input pulses and said waveforms from said test circuit.

17. Apparatus according to claim 15, wherein said means includes an OR circuit, to which is applied said input pulses and said waveforms from said test circuit.

18. Apparatus according to claim 15, wherein said means includes an AND circuit, an OR circuit, and a comparator circuit, said input pulses and said waveforms from said test circuit being applied to said AND circuit and to said OR circuit, said comparator means being selectively connectable to either said AND circuit or said OR circuit.

19. Apparatus for providing a voltage representative of the delay time of a test circuit when repetitive pulses are applied thereto, comprising:
a test circuit to which is applied said input pulses,
means connected to said test circuit for receiving waveforms from said test circuit and said repetitive pulses, said means providing output pulses whose pulse width is indicative of said delay time,
an integrator circuit whose output is representative of said delay time when said apparatus is in equilibrium, said integrator having first and second input channels, the output pulses from said means being applied to said first input channel,
circuit means having an input terminal, an output terminal, and a control terminal, said input pulses being applied to said input terminal, and said output terminal being connected to the second channel of said integrator,
a feedback path from said integrator to the control terminal of said circuit means to control the time duration of output pulses appearing at said output terminal.

References Cited

UNITED STATES PATENTS

| | | | |
|---|---|---|---|
| 2,803,818 | 8/1957 | Byrne | 324—68 XR |
| 3,246,247 | 4/1966 | Grindle | 328—112 XR |
| 3,274,514 | 9/1966 | Fougler | 328—112 XR |

RUDOLPH V. ROLINEC, *Primary Examiner.*

E. E. KUBASIEWICZ, *Assistant Examiner.*

U.S. Cl. X.R.

307—234; 324—68, 123, 158

UNITED STATES PATENT OFFICE
CERTIFICATE OF CORRECTION

Patent No. 3,431,490                                    March 4, 1969

Theodore W. Kwap et al.

It is certified that error appears in the above identified patent and that said Letters Patent are hereby corrected as shown below:

Column 8, line 14, "so" should read -- to --; line 66, cancel "an integrator having first and second pluralities".

Signed and sealed this 7th day of April 1970.

(SEAL)
Attest:

Edward M. Fletcher, Jr.                       WILLIAM E. SCHUYLER, JR.
Attesting Officer                                    Commissioner of Patents